United States Patent [19]

Schloman, Jr. et al.

[11] Patent Number: 4,829,117

[45] Date of Patent: May 9, 1989

[54] STABILIZATION OF GUAYULE-TYPE RUBBERS

[75] Inventors: William W. Schloman, Jr., Stow; William M. Cole, Norton; Frank J. Clark, Massillon; Robert T. Beinor, Uniontown, all of Ohio

[73] Assignee: The Firestone Tire & Rubber Company, Akron, Ohio

[21] Appl. No.: 65,240

[22] Filed: Jun. 22, 1987

[51] Int. Cl.$^4$ ................................................ C08K 5/13
[52] U.S. Cl. .................................... 524/313; 524/318; 524/349; 524/350; 524/376; 524/377; 524/378; 524/340; 528/930
[58] Field of Search ................ 528/930, 938; 524/291, 524/349, 350, 310, 376, 377, 378, 340, 375, 308, 313, 317, 318; 252/404; 260/398.5; 568/581, 703

[56] References Cited

U.S. PATENT DOCUMENTS

| | | | |
|---|---|---|---|
| 1,753,184 | 4/1930 | Spence | 524/255 |
| 1,753,185 | 4/1980 | Spence | 524/255 |
| 2,464,927 | 3/1949 | Hall et al. | 260/398.5 |
| 2,607,745 | 8/1952 | Magoffin | 260/398.5 |
| 2,607,746 | 8/1952 | Magoffin | 260/398.5 |
| 2,777,008 | 1/1957 | Kern et al. | 524/925 |
| 2,942,033 | 6/1960 | Leis et al. | 568/581 |
| 2,981,628 | 4/1961 | Hall | 252/404 |
| 2,999,841 | 12/1961 | Csendes | 524/350 |
| 3,019,269 | 1/1962 | Clough | 252/401 |
| 3,146,272 | 8/1964 | Lloyd | 568/581 |
| 3,337,495 | 8/1967 | Corbett et al. | 524/350 |
| 4,341,677 | 7/1982 | Tamosauskas | 524/310 |
| 4,405,532 | 9/1983 | Gutierrez et al. | 528/930 |
| 4,616,075 | 10/1986 | Malani | 528/930 |

OTHER PUBLICATIONS

U.S. Dept. of Commerce Report by the U.S. Natural Rubber Research Station, Salines, California, Apr. 30, 1953, "Natural Rubber Extraction and Processing Investigation" Final Report, pp. 126–132.
India Rubber World–vol. 110, pp. 57–58 & 63.

*Primary Examiner*—Veronica P. Hoke
*Attorney, Agent, or Firm*—Daniel N. Hall

[57] ABSTRACT

A stabilizing composition and process for guayule type rubbers which can be directly applied to guayule-type plants or shrubs before processing thereof, or to guayule-type rubber miscella, rubber-resin miscella, etc., contains a volatile low melting point antioxidant which is either liquid or solid and an optional liquid inert carrier which lowers the melting point of the antioxidant. Since antioxidants are generally expensive, recovery thereof as by distillation is aided through the utilization of low boiling point antioxidants.

12 Claims, No Drawings

4,829,117

STABILIZATION OF GUAYULE-TYPE RUBBERS

FIELD OF THE INVENTION

The present invention relates to the stabilization of guayule-type rubbers regardless of processing state, that is whether still contained in the plant or shrub or in a miscella system, etc., through the use of a stabilizing composition containing a low melting point antioxidant and optionally a liquid inert carrier. The present invention further relates to the recovery of the antioxidants contained within the composition.

BACKGROUND

U.S. Pat. Nos. 1,753,184 and 1,753,185 to Spence relate to enhancing the storage of guayule shrub by adding an amine stabilizing agent to stabilize the shrub and the rubber content thereof against deterioration.

U.S. Pat. No. 4,616,075 to Malani and Clark relates to enhancing the storage of guayule shrub by compression and forming a densified pellet to which antioxidants may be added. Antioxidants used included 2,6di-t-butyl-p-cresol and 6-t-butyl-2,4-xylenol.

SUMMARY OF THE INVENTION

It is therefore an aspect of the present invention to provide a stabilizing composition and process for stabilizing guayule-type rubber through the utilization of a volatile antioxidant in association with an optional liquid inert carrier. Desirably, the antioxidant, which can be liquid or solid, has a low melting point and the liquid inert carrier further depresses the melting point thereof. The inert carrier is generally used when the stabilizing composition is applied directly to preprocessed guayule type shrubs but is generally not used when the stabilizing composition is applied to a miscella. The miscella is a dilute solution of rubber and resin extracted from guayuale-type shrubs with solvents. The antioxidant desirably has a low boiling point so that it can be readily recovered as through a process of distillation or the like and recycled.

These and other aspects of the present invention will become more apparent from the following detailed description of the invention.

DETAILED DESCRIPTION OF THE INVENTION

According to the concepts of the present invention, a stabilizing composition which can be a liquid or a solid contains a low melting point liquid or solid volatile antioxidant and an optional liquid inert carrier which depresses the melting point of the antioxidant. The stabilizing composition can be applied to guayule type plants to stabilize the guayule type rubber therein. Preprocessed plants are treated with the volatile antioxidant containing composition in a liquid form, that is heat is applied to melt the volatile antioxidant if it is a solid. The inert carrier is generally utilized in the stabilizing composition applied to preprocessed plants. As a consequence, the rubber contained in the shrub is stabilized with a volatile antioxidant prior to extraction thereof. Desirably, the antioxidant is readily recoverable since it has a low boiling point. Alternatively, the volatile antioxidant in either a liquid or a solid form is added generally without any liquid inert carrier to a rubber containing miscella system. If solid, the volatile antioxidant is dissolved therein. By either of these methods, rubber from guayule-type plants is stabilized with a recoverable antioxidant. The plants or miscella thus stabilized has a low rate of oxidation.

Guayule-type plants which can be utilized to prepared rubber-containing miscellas include guayule, gopher plant (*Euphorbia lathyris*), mariola (*Parthenium incanum*), rabbitbrush (*Chrysothanmus nauseosus*), candelilla (*Pedilanthus macrocarpus*), Madagascar rubbervine (*Cryptostegia grandiflora*), milkweeds (*Asclepias syriaca, speciosa, subulata,* et al.), goldenrods (*Solidago altissima, graminifolia, rigida,* et al.), Russian dandelion (*Taraxacum kok-saghyz*), mountain mint (*Pycnanthemum incanum*), American germander (*Teucreum canadense*), and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families, and hence can be utilized. It is to be understood that the rubbers from such plants including guayule plants fall under the general classification of "guayule type" rubbers and hence can be utilized either alone or in combination with each other. Hereinafter whenever reference is made to guayule plants or shrubs, it is to be understood that the above-noted plants and shrubs can also be utilized.

The guayule shrub or plant is prepared by initially grinding it into small particles. Generally, the entire plant is fed whole, that is with the leaves thereon as well as dirt or foreign debris, into a grinding apparatus, for example a hammermill. The ground material can be flaked, that is crushed by adding to a two-roll mill or other conventional equipment which ruptures the rubber-containing cells.

The comminuted plants are subjected to a resin-rubber solvent system. The solvent system contains one or more solvents which extract both the resin as well as the rubber from the guayule-type shrub. Examples of single-solvent systems include halogenated hydrocarbons having from 1 to 6 carbon atoms, such as chloroform, perchlroethylene, chlorobenzene, and the like; and aromatic hydrocarbons and alkyl-substituted aromatic hydrocarbons having from 6 to 12 carbon atoms, such as benzene, toluene, xylene, and the like.

Desirably, the solvent system contains one or more polar resin solvents as well as one or more hydrocarbon rubber solvents. Typical polar resin solvents include alcohols having from 1 to 8 carbon atoms, such as methanol, ethanol, isopropanol and the like; esters having from 3 to 8 carbon atoms such as the various formates, the various acetates and the like; ketones having from 3 to 8 carbon atoms, such as acetone, methyl ethyl ketone, and the like. Typical non-polar hydrocarbon rubber solvents include alkanes having from 4 to 10 carbon atoms, such as pentane, hexane, and the like; and cyclo-alkanes having from 5 to 15 carbon atoms, such as cyclohexane, decalin, the various monoterpenes, and the like. Although the two types of solvents can form a two-phase system, they often form a single phase when utilized in proper proportions. One manner of adding different type solvents to the shrub is separately, but simultaneously. However, they are generally prepared as a mixture and added as such.

Accordingly, numerous combinations of a polar resin solvent and a hydrocarbon rubber solvent can exist. A specific solvent system is an azeotropic composition of approximately 80% by weight of pentane, more specifically 78.1% by weight, and 20% by weight of acetone, more specifically 21.9% by weight. The ratio by weight of solvent to the amount of shredded shrub can be any amount sufficient to generally extract most of the rubber and resin, as for example from about 1 part by weight of solvent up to about 20 parts by weight of solvent for each 1 part by weight of shrub, and preferably about 3 parts by weight of solvent to 1 part by weight of shrub. The rubber-resin miscella so obtained typically contains about 1 to 25% by weight of total solids, that is resin plus rubber, and preferably about 9 to 18% by weight of total solids with the amount of resin by weight being from about 1 to about 3 parts for every 1 part by weight of rubber.

According to a concept of the present invention, the stabilizing composition is desirably added to the rubber-resin miscella to stabilize the rubber polymer contained therein. It is noted that should the antioxidant and hence the stabilizing composition be a solid, it will dissolve in the miscella. In order to coagulate the high molecular weight rubber polymer, excess polar resin solvent is added to the rubber-resin miscella. The coagulated rubber can be recovered from the resulting mixture by means of a suitable filtration, centrifugation, or sedimentation step. The resulting miscella decantate or filtrate contains resin and antioxidant essentially free of high molecular weight rubber polymer. It is to be understood that generally any guayule-type rubber miscella system can be stabilized according to the present invention whether it be a rubber-resin miscella, a rubber miscella, or the like.

Instead of comminuting the plants to form a rubber miscella system which is subsequently stabilized by the addition of one or more antioxidants, another concept of the present invention relates to a stabilizing composition which desirably contains an liquid inert carrier therein and is directly applied to the plant or shrub, that is the whole plant or shrub or comminuted plant or shrub. The noncomminuted shrub or plant is subsequently comminuted and subjected to a solvent system to form a rubber-resin miscella containing the antioxidant therein. It is noted that should the antioxidant and hence the stabilizing composition be a solid, it is heated to melt the same and applied as a liquid.

Regardless of whether such a preprocessing application of an antioxidant to the guayule plant is utilized or the application of the antioxidant to the rubber-resin miscella, an antioxidant is utilized which stabilizes the guayule-type rubber. By the term "stabilized", it is meant that the relative oxidation rate of the guayule type rubber is slowed or reduced, at least 20%, desirably at least 40%, and preferably at least 50% or 60%. According to the concepts of the present invention, such stabilizing antioxidants have a low melting point and hence can exist as either a liquid or as a solid relatively near its melting point. Such low melting point antioxidants generally have a melting point of 100° C. or less, desirably 70° C. or less, and preferably 60° C. or less.

Since antioxidants tend to be relatively expensive, it is highly desirable to recover the same, that is to recycle any antioxidant. In order to be recoverable, it is another important aspect of the present invention that a low boiling point stabilizing guayule-type antioxidant be utilized. By the term, "a relatively low boiling point", it is meant that the boiling point of the antioxidant is generally 300° C. or less, desirably 265° C. or less, and preferably 255° C. or less. A desired class of antioxidants for use in the present invention are the various volatile monohydric hindered phenols with specific examples including 2,6-di-t-butyl-p-cresol (BHT) available as DBPC manufactured by Koppers and 6-t-butyl-2,4-xylenol (TBX), a liquid available as Prodox 340 manufactured by Ferro. Such antioxidants can be utilized either alone or in combination with other antioxidants as well as with antidegradants such as various antiozonates, and the like. As noted above, the stabilizing antioxidants of the present invention can be added to the shrub prior to processing or rubber extraction, or at any point during processing an extraction of the rubber component thereof.

The inert carriers utilized in the present invention are liquids and desirably are utilized in effective amounts to produce a depressed melting point of the antioxidant of from about 1° to about 50° C. and desirably from about 5° to about 20° C. An effective amount of the inert carrier is generally from about 1 part to about 100 parts by weight, desirably from about 1 part to about 50 parts by weight, and preferably from about 5 parts to about 25 parts by weight for every 100 parts by weight of antioxidant utilized. The result is a stabilized guayule-type composition. When the stabilizing composition is a liquid, it can be conveniently applied to any preprocessed guayule-type plants in any conventional manner as by spraying, dipping, coating, or the like, as well as directly applied to any resin-rubber miscella or other rubber extraction treating or processing step. When the composition is a solid, it is heated to a suitable temperature to form a liquid and applied by any of the above methods.

The inert carriers of the present invention generally have a molecular weight of less than 1,000 and preferably less than 600. Examples of liquid inert carriers include vegetable oils such as corn oil, palm oil, sunflower seed oil, and the like; vegetable liquid waxes such as jojoba wax, and the like; liquid polyethylene and polypropylene glycols such as Carbowax Polyethylene Glycol 200, Carbowax Polyethylene Glycol 400, and Carbowax Polyethylene Glycol 600 and the like, manufactured by Union Carbide; ethylene glycol monoethers such as Methyl Cellosolve and Butyl Cellosolve, manufactured by Union Carbide, and Dowanol EPh Glycol Ether, manufactured by Dow Chemical; ethylene glycol diethers such as dimethoxyethane, diethoxyethane, and the like; esters of ethylene glycol monoethers such as Methyl Cellosolve Acetate, manufactured by Union Carbide; diethylene glycol ethers such as Methyl Carbitol and Butyl Carbitol, manufactured by Union Carbide; esters of diethylene glycol ethers such as Butyl Carbitol Acetate, manufactured by Union Carbide; propylene glycol ethers and higher homologs such as Dowanol PM Glycol Ether, Dowanol TPM Glycol Ether, Dowanol PiBT Glycol Ether, and Dowanol PPh Glycol Ether, manufactured by Dow Chemical; polyoxyethylene sorbitan monoesters of fatty acids such as Tween 20, Tween 40, and Tween 80, manufactured by ICI Americas; and alkylphenol ethoxylates such as Igepal CA-210, Igepal CA-520, Igepal CO-210, and Igepal CO-520, manufactured by GAF Corp.

An effective amount of antioxidant is applied to the surface of the guayule type plant to provide a low rate of rubber oxidation in miscella solution. For a typical rubber-resin miscella, about 0.1 to 10 parts by weight, desirably about 0.1 to 5 parts by weight, and preferably about 0.5 to 2 parts by weight of antioxidant are added for every 100 parts by weight of total solids content. Since guayule type plants typically contain about 4–6% by weight of rubber and 10–20% by weight of resin, the amount of antioxidant applied is about 0.01 to 3 parts by weight, desirably about 0.01 to 2 parts by weight, and preferably about 0.07 to 0.6 parts by weight per (that is, for every) 100 parts of plant material.

After rubber coagulation and removal, the miscella decantate or filtrate can be desolventized for subsequent antioxidant recovery. Recovery can be effected by any number of methods such as by steam sparge or distillation. Distillation is most conveniently carried out at reduced pressure with the level of pressure reduction being chosen in accordance with the boiling point of the particular antioxidant. The distillates so obtained typically contain the antioxidant along with various amounts and types of volatile resin components. Alternatively, the mixture can be cooled to effect crystallization of solid antioxidants. The antioxidant can then be recovered by means of a suitable filtration step. Regardless of method utilized, it is an important aspect of the present invention to recover at least the antioxidant for subsequent use.

The invention will be better understood by reference to the following examples:

EXAMPLE 1

Shrub Preparation

Whole guayule plants including roots, stems, and leaves were introduced into a Champion Chop-N-Throw hammermill fitted with a variable geometry screen. To remove leaves, seeds, and dirt, the milled material was air classified by being passed through a Progressive Industries Model MS-5 Micro-Sizer air classifier. The air classified material was then passed through the rolls of a Roskamp differential-speed, 2-rool mill set at zero nip. The flaked material was passed through the 2-roll mill a second time to insure maximum cell rupture.

EXAMPLE 2

BHT-Carrier Melting Point Determination

Following the method in Palmer, "Experimental Physical Chemistry", University Press: Cambridge, UK, 1962, pp 94–98, BHT, that is 2,6-di-t-butyl-p-cresol, and mixtures of BHT with various carriers were fused and the melting points ($T_m$) determined. Table I lists the melting points and melting point depressions ($\Delta T$) for the various mixtures.

EXAMPLE 3

Spray Application of Antioxidant

An airless electric spray gun was charged with molten BHT (Ferro industrial grade) or BHT mixed with carrier. Two mixtures were applied: 1 part by weight of Carbowax 200 per 9 parts by weight of BHT, and 1 part by weight of Ethyl Carbitol per 9 parts by weight of BHT. The molten antioxidant samples were maintained at about 72°–79° C. In each application, the spray stream was directed onto a bed of ground guayule. Sufficient antioxidant was applied to the plant material to obtain a surface loading of about 1 part by weight of BHT per 100 parts by weight of shrub. When carrier-free BHT was applied, the antioxidant rapidly crystallized on the surface of the ground shrub. When either of the BHT-carrier mixtures was applied, the mixture penetrated the surface of the plant material without crystallizing.

EXAMPLE 4

Miscella Stabilization

To a 10-gal jacketed reactor fitted with a Rushton turbine agitator was charged 550 g of resin-free guayule rubber and the appropriate quantity of antioxidant. To remove oxygen, the reactor was sealed, pressurized with nitrogen to 345 kPa, then vented to 35 kPa. This process was repeated nine times. Using nitrogen pressure, 5900 g of acetone-pentane azeotrope was charged to the reactor. The reactor was vented to 35 kPa. The mixture was agitated at about 52° C. for 12 hrs. to dissolve the rubber. Using nitrogen pressure, a mixture of 1100 g of resin in 900 g of acetone-pentane azeotrope was charged to the reactor. The reactor was pressurized an additional 138 kPa with air introduced through the reactor bottom. The initial miscella sample was taken at this time. Agitation at about 52° C. was continued until sampling was completed. The rubber-resin miscella was sampled, and any oxidation reactions were quenched by purging into a 1.5-L sampling cylinder containing 5 g of Santoflex 13 dissolved in about 250 mL of acetone-pentane azeotrope. Rubber was coagulated from the sample by slowly emptying the cylinder contents into about 13.5 L of acetone containing 25 g of Santoflex 13. The resulting rubber crumb was desolventized on a drum dryer. The Mooney viscosity of the rubber sample so obtained was determined in accordance with ASTM Method D-1646. Table II summarizes the variation in Mooney viscosity over time as a function of antioxidant level.

EXAMPLE 5

TBX Recovery from Rubber-Free Resin

A reactor fitted with a thermometer and sparge tube was charged with 230 g of resin and 23 g of TBX, that is 6-t-butyl-2,4-xylenol. Volatiles were removed by means of a steam sparge at 210°–230° C. until 48 g of organic overheads and 400 g of water had been collected. The organic overheads contained 47% by weight of TBX, equivalent to 22.5 g.

EXAMPLE 6

BHT Recovery from Rubber-Free Resin

No Carrier

A reactor fitted with a thermometer and distilling head with fraction cutter was charged with 115 g of resin and 12 g of BHT. The pressure in the reactor was reduced by means of a vacuum pump to facilitate distillation of volatile components. After a forerun, bp 135° C. (70 Pa), 12.5 g of volatiles were collected. Upon cooling the distillage to 0°–10° C. and filtration, 9 g of BHT was recovered.

EXAMPLE 7

BHT Recovery from Rubber-Free Resin

Carbowax 200 Carrier

Following the procedure in Example 6, a mixture of 96 g of resin, 9 g of BHT, and 1 g of Carbowax 200, was distilled to yield 14 g of volatile components, bp 150°–200° C. (170–270 Pa), from which 5 g of BHT were recovered by crystallization and filtration.

EXPLANATION OF EXAMPLES

EXAMPLE 1 sets forth the procedures used in preparing the shrub for further processing. This can be antioxidant spraying or extraction. This initial step was used for all of these different processes.

EXAMPLE 2 sets forth the effects of carriers on the melting point of BHT. From EXAMPLE 2, it can be seen that mixtures of BHT and various carriers have significantly lower melting points than does BHT by itself.

EXAMPLE 3 sets forth the effects of a representative carrier on the spray application characteristics of BHT. From EXAMPLE 3, it can be seen that the carrier improves the applications characteristics of the antioxidant by lowering the melting point, thereby permitting penetration of the woody plant tissue and increasing contact with the rubber therein.

EXAMPLE 4 sets forth the effects of various levels of antioxidant on the stability of a rubber-resin miscella, as measured by the bulk physical properties of the rubber. Nair, J. Rubber Res. Inst: Malaya, 1970, 23(1), 76–83, describes the relationship of the bulk viscosity of natural rubber to its molecular parameters, particularly the intrinsic viscosity. Bell, Rubber Chem. Technol., 1966, 39, 530–536, further describes the relationship of changes in intrinsic viscosity of natural rubber to the rate of oxidative scission in solution. In this way, the change in Mooney viscosity reflects the rate in oxidative scission of natural rubber in solution. The relative rates of rubber oxidation, derived from the changes in Mooney viscosity, are summarized in Table II. From the rates determined in Example 4, it can be seen that BHT is an effective antioxidant in a rubber-resin miscella. The minor increase in oxidation rate at higher levels of BHT is consistent with the occurrence of competitive prooxidant effects at higher levels of hindered phenolics, as reported by Shelton, Rubber Chem. Technol., 1972, 45(3), 359–380.

EXAMPLES 5 through 7 set forth the various modes of antioxidant recovery. Both steam sparging and vacuum distillation are effective methods for recovery of volatile antioxidants.

The melting points obtained from the compositions of the present invention as well as stabilization data are set forth in Table I and II, respectively.

TABLE I

MELTING POINT DATA, BHT-CARRIER MIXTURES

| Carrier | Carrier Level, wgt % of mixture | $T_m$, °C. | $\Delta T$, °C. |
|---|---|---|---|
| None | — | 63.5 | — |
| Carbowax 200 | 5.4 | 59.5 | 4 |
| Carbowax 200 | 10.2 | 55.5 | 8 |
| Carbowax 400 | 5.4 | 58 | 5.5 |
| Methyl Carbitol | 5.4 | 53 | 10.5 |
| Ethyl Cellosolve | 5.6 | 51.5 | 12 |
| Ethyl Cellosolve Acetate | 5.5 | 52 | 11.5 |
| Dowanol TPM | 5.6 | 51 | 12.5 |
| Corn Oil | 19.6 | 47.5 | 16 |

TABLE II

MISCELLA STABILIZATION DATA

| BHT wgt. %[a] | Time, hr. | ML 1 + 4 (100° C.)[b] | Relative Oxidation Rate |
|---|---|---|---|
| None | 0 | 72.5 | 1.00 |
|  | 2 | 70.5 |  |
|  | 5 | 68.5 |  |
|  | 21 | 57.5 |  |
|  | 36 | 49 |  |
|  | 75 | 39 |  |
| 1.0 | 0 | 75 | 0.43 |
|  | 3.5 | 75.5 |  |
|  | 8 | 74.5 |  |
|  | 24 | 65 |  |
|  | 48 | 63 |  |
|  | 96 | 54 |  |
| 3.0 | 0 | 73.5 | 0.54 |
|  | 3 | 75.5 |  |
|  | 7.5 | 71.5 |  |
|  | 24 | 65.5 |  |
|  | 48 | 59 |  |
|  | 96 | 48.5 |  |

[a]Based on total solids content of miscella. BHT added as 9:1 w/w mixture with Carbowax 400.
[b]Resin content 4%.

As apparent from Table I, utilization of various inert carriers in relatively small amounts resulted in depressing the melting point of the BHT antioxidant. Table II demonstrates that the oxidation rate of guayule miscella was dramatically reduced utilizing small amounts of BHT antioxidant. Thus the stabilizing composition of the present invention not only reduces the melting point of the antioxidant contained therein but also abates oxidation of any quayule-type rubber utilized. Moreover, the antioxidant can be readily recovered as demonstrated in EXAMPLES 5 through 7 and hence can be recycled.

While in accordance with the patent statututes, a best mode and preferred embodiment has been set forth, the scope of the claims in not limited thereby but rather by the scope of the attached claims.

What is claimed is:

1. A stabilized guayule-type rubber composition comprising:

a guayule-type rubber contained in a guayule-type plant or a guayule-type miscella;

from about 0.01 to about 3.0 parts by weight for every 100 parts by weight of a guayule-type plant or from about 0.1 to about 10 parts by weight for each 100 parts by weight of a guayule-type miscella of a low melting point antioxidant, said antioxidant having a melting point of 100° C. or less, and from about 1 part to about 100 parts by weight of an liquid inert carrier for every 160 parts by weight of said antioxidant, said liquid inert carrier forming a solution with said antioxidant, said inert liquid carrier being a vegetable oil, a vegetable liquid wax, a liquid polyethylene or polypropylene glycol, an ethylene glycol monoether, an ethylene glycol diether, an ester of ethylene glycol monoether, a diethylene glycol ether, an ester of diethylene glycol ether, a propylene glycol ether and a higher homolog thereof, a polyoxethylene sorbitan monoester of fatty acid, or combinations thereof.

2. A composition according to claim 1, wherein the boiling point of said antioxidant is 300° C. or less.

3. A composition according to claim 2, wherein the melting point of said antioxidant is 70° C. or less, wherein the boiling point of said antioxidant is 265° C. or less, wherein the amount of said antioxidant is from about 0.01 to about 2.0 parts by weight for every 100 parts by weight of said guayule-type plant, and wherein the amount of said antioxidant is from about 0.1 to about 5 parts by weight for every 100 parts by weight of said guayule-type miscella, and wherein said antioxidant is a monohydric hindered phenol.

4. A process for reducing the oxidation rate of guayule-type rubber comprising the steps of:
   obtaining a guayule-type miscella containing guayule-type rubber therein from a guayule-type plant, and
   adding an effective amount of a guayule-type stabilizing composition to said guayule-type miscella and stabilizing said guayule-type miscella, said composition containing an antioxidant having a melting point of 100° C. or less and a liquid inert carrier, and
   forming a solution of said antioxidant and said liquid inert carrier, said liquid inert carrier depressing the melting point of said antioxidant from about 1° C. to about 50° C., said inert liquid carrier being a vegetable oil, a vegetable liquid wax, a liquid polyethylene or polypropylene glycol, an ethylene glycol monoether, an ethylene glycol diether, an ester of ethylene glycol monoether, a diethylene glycol ether, an ester of diethylene glycol ether, a propylene glycol ether and a higher homolog thereof, a polyoxyethylene sorbitan monoester of fatty acid, or combinations thereof.

5. A process according to claim 4,
   wherein the effective amount of said antioxidant is from about 0.1 parts by weight to about 10 parts by weight for every 100 parts by weight of said guayule-type miscella, and wherein the effective amount of said inert carrier is from about 1 part to about 100 parts by weight for every 100 parts by weight of said antioxidant.

6. A process according to claim 5, wherein the melting point of said antioxidant is 70° C. or less, wherein the amount of antioxidant is from about 0.1 parts by weight to about 5 parts by weight for every 100 parts by weight of said guayule-type miscella, and wherein the amount of said liquid inert carrier is from about 1 part to about 50 parts by weight for every 100 parts by weight of said antioxidant.

7. A process according to claim 6, including recovering said antioxidant from said guayule-type miscella, said antioxidant having a boiling point of 300° C. or less, and wherein said antioxidant is a monohydric hindered phenol.

8. A process according to claim 7, wherein said antioxidant is 2,6-di-t-butyl-p-cresol, 6-t-butyl-2,4-xylenol, or combinations thereof.

9. A composition according to claim 3, wherein the amount of said antioxidant is from about 0.07 to about 0.6 parts by weight for every 100 parts by weight of said guayule-type plant material or from about 0.5 to about 2.0 parts by weight for every 100 parts by weight of said guayule-type miscella, and wherein the amount of said inert carrier is from about 5 to about 25 parts by weight for every 100 parts by weight of said antioxidant.

10. A composition according to claim 9, wherein said antioxidant is 2,6-di-t-butyl-p-cresol, 6-t-butyl-2,4-xylenol, or combinations thereof.

11. A composition according to claim 9, wherein said liquid inert carrier depresses the melting point of said antioxidant from about 5° C. to about 20° C.

12. A process according to claim 8, including depressing the melting point of said antioxidant from about 5° C. to about 20° C.

* * * * *